UNITED STATES PATENT OFFICE.

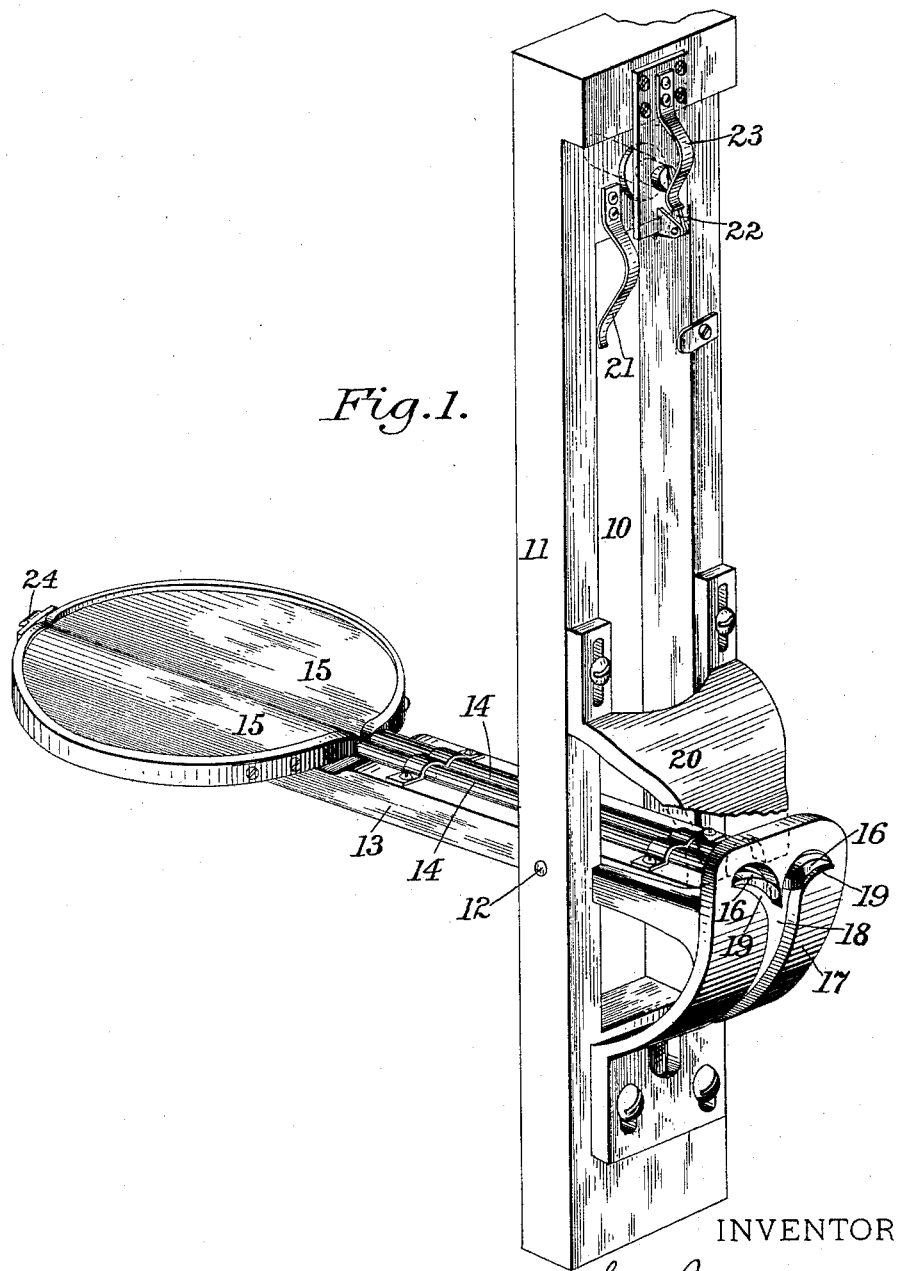

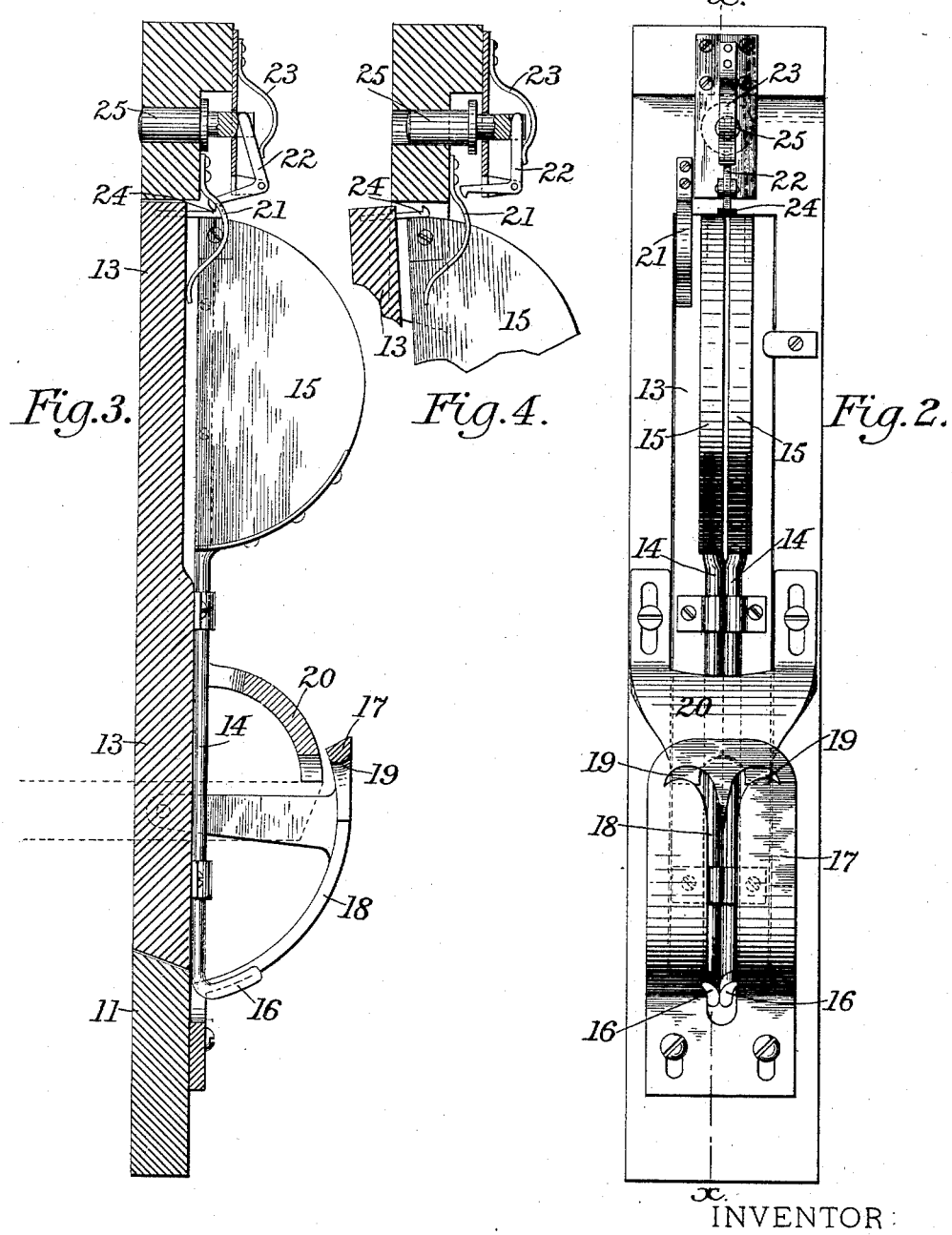

LARS NILSON, OF FLUSHING, NEW YORK.

LAMP-SUPPORT.

SPECIFICATION forming part of Letters Patent No. 468,442, dated February 9, 1892.

Application filed November 6, 1891. Serial No. 411,026. (No model.)

*To all whom it may concern:*

Be it known that I, LARS NILSON, of Flushing, in the county of Queens and State of New York, have invented a new and useful Improvement in Lamp-Supports; and I do hereby declare that the following is a full and exact description thereof, reference being had to the accompanying drawings, and to the figures of reference marked thereon, making a part of this specification.

My invention has for its object to provide a novel support for lamps or other articles for pianos, organs, and other similar cabinet-work, which, when not in use, may be entirely closed within the casing, shall occupy very little space, and shall not injure the appearance of the casing, while at the same time it presents a firm and ample support when in use.

To this end my invention consists in the construction hereinafter described and claimed.

In the drawings, Figure 1 is a perspective view of my novel support from the rear, showing the same in position for use and showing also a portion of the frame or casing to which the support is applied. Fig. 2 is a rear elevation of the same when closed. Fig. 3 is a central section on the line $x$ $x$ of Fig. 2, and Fig. 4 is a detail sectional view showing the position of the parts as the support is released.

Within an aperture 10 of the frame or casing 11 is hinged or pivoted, as by pins 12, an arm 13, which has its outer surface finished to correspond with the finish of the casing and to fit snugly within the aperture. Upon the arm 13 are journaled two rods 14 14, each of which bears one of the leaves 15 15, which, when in the position shown in Fig. 1, constitute a base on which may be placed a lamp or other article. Each rod is also provided at or near its inner end with a cam finger or projection 16.

Fixed to the casing near the lower end of the swinging arm is a plate 17, curved to correspond with the path of movement of the cam-fingers 16 and grooved or slotted, as at 18, to receive the ends of the rods 14 with the fingers 16, as represented. For the greater portion of the length thereof the slot or slots are straight and of such width as to compel the fingers 16 to stand substantially parallel, but at their upper ends 19 they diverge and become substantially horizontal. A stop-plate 20 may be adjustably secured to the casing to stand in the path of movement of the arm 13 and check it in the proper position without straining the rods 14 or fingers 16.

The mode of operation of the device will be readily understood from the drawings. When the arm 13 is in the position represented in Figs. 2 and 3, the leaves 15 will stand close together, thereby permitting the aperture 10 to be made very narrow. As the arm moves downward, the leaves will retain their position until after they have cleared the casing entirely, when the fingers 16 will enter the diverging portions of the slot or groove and cause the leaves to spread apart and form a flat and level surface, as shown in Fig. 1.

Whenever the finish of the casing is such as to permit it, the arm 13 may be formed on its exterior surface with a projection, which may be grasped by the fingers to enable the arm to be pulled out from the aperture; but when the finish is flat it will be necessary to provide means for throwing out the arm a short distance and means to retain the arm in position against the action of such means. I have shown in the drawings a convenient device for this purpose, the same consisting of a spring 21, which is put under tension when the arm is pushed in place in the aperture, and a suitable latch. As shown, the latching device is composed of a latch-lever 22, pressed by a spring 23 to engage with a hook 24 on the arm 13, and a push-button 25. In operation the arm 13 will be thrown out by the spring 21 far enough to be grasped by the fingers when the push-button is pressed.

Though I prefer to employ two rods and leaves in order to divide the strain, it is obvious that a single rod and leaf might be employed in some cases.

I claim as my invention—

1. The combination, with the casing, of a swinging arm, a rod journaled on said arm and provided with a supporting-leaf and with a cam-finger, and a plate having a curved cam-slot and conforming to the path of movement of said cam-finger, substantially as shown and described.

2. The combination, with the casing, of a swinging arm, rods journaled on said arm and provided each with a supporting-leaf and with a cam-finger, and a plate having diverging slots and conforming to the path of movement of said fingers, substantially as shown and described.

3. The combination, with the casing, of a swinging arm, rods journaled on said arm and provided each with a supporting-leaf and with a cam-finger, a plate having diverging slots and conforming to the path of movement of said cam-fingers, and a stop to limit the movement of said arm, substantially as shown and described.

4. The combination, with the casing, of a swinging arm, a rod journaled on said arm and provided with a supporting-leaf and a cam-finger, a plate having a curved slot and conforming to the path of movement of said cam-fingers, and a latch to retain and release said swinging arm, substantially as shown and described.

In testimony whereof I have signed my name to this specification in the presence of two subscribing witnesses.

LARS NILSON.

Witnesses:
   A. N. JESBERA,
   A. WIDDER.